United States Patent
Dye

(10) Patent No.: US 6,791,100 B2
(45) Date of Patent: Sep. 14, 2004

(54) OBJECT DETECTION USING CODE-MODULATED LIGHT BEAM

(75) Inventor: Wai Hung Dye, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 34 days.

(21) Appl. No.: 10/223,530

(22) Filed: Aug. 19, 2002

(65) Prior Publication Data

US 2004/0031937 A1 Feb. 19, 2004

(51) Int. Cl.[7] .............................................. G01N 21/86
(52) U.S. Cl. .................................... 250/559.4; 250/221
(58) Field of Search ............................. 250/559.4, 221, 250/222.1, 223 R, 214 R, 235, 566; 356/239.8; 358/488, 498; 340/555, 556, 557

(56) References Cited

U.S. PATENT DOCUMENTS 4,954,846 A * 9/1990 Matsuo et al. ................ 399/51

* cited by examiner

Primary Examiner—Que T. Le
(74) Attorney, Agent, or Firm—The Harleston Law Firm, LLC

(57) ABSTRACT

An input document detecting method includes the steps of: (a) modulating a light source of a relative-type optical sensor with a coded digital/analog signal; (b) emitting a code-modulated light beam and directing it toward the object; (c) collecting the reflected code-modulated light beam with a receiver portion of the optical sensor; (d) forwarding the signal from the reflected light beam through an AC amplifier; and (e) feeding the amplified signal to a decoder. Also included is a system (10) for detecting the presence of an object including: a) a modulator (11) and a driver (12); b) a reflective-type optical sensor (13) with an analog output, and a lightsource; an IR transmitter and a receiver portion with a built-in IR filter for collecting a reflected code-modulated light beam; c) a high gain AC amplifier (14) for amplifying the signal from the reflected light beam; and d) a decoder (15).

17 Claims, 2 Drawing Sheets

OBJECT DETECTION USING CODE-MODULATED LIGHT BEAM

FIELD OF THE INVENTION

The invention relates to an input document detecting system and method, more particularly, a system and method utilizing a code-modulated light beam to detect the presence or absence of an object in a high speed document scanner or the like.

BACKGROUND OF THE INVENTION

A high-speed document scanner runs at 160 pages per minute (about 3 pages per second) using 8.5"×11" size paper. It runs even faster using smaller sized documents, such as checks or business cards. It is difficult for an operator to feed a document manually into the scanner at such a high speed. In order to maintain throughput of the system, an Automatic Document Feeder (ADF) is used to supply a document to the scanner. With its adjustable guide, the Automatic Document Feeder is capable of handling documents, including paper, in a variety of sizes (from business card to B-size drawing), types (from onion-skin to cardboard), and colors. When the document/paper supply is empty, the Automatic Document Feeder tray will automatically be lowered, allowing the operator to load the next batch of documents. This general type of device has been included in an Automatic Document Feeder in the present invention to detect the emptiness of a document/paper supply tray. The device is mounted at the bottom of a document supply tray, where it monitors the back of the bottom sheet in the supply tray through an open hole.

In conventional printers, an optical sensor at the paper tray is used to detect the presence or absence of an uppermost sheet of paper at the start of the paper feed path. The optical sensor is often a photoreflector-type device mounted on a side of a guide on the paper tray. A light beam produced by the light source of the photoreflector device bounces off the sheet of paper, runs through a paper detecting circuit, and the presence or absence of the sheet is read. There will be no returned signal to the receiver of the optical sensor when the last sheet of paper, or other document, is fed.

To detect the presence of an object, a commonly used method measures the strength of returned energy. An AC or DC powered light source is used as a sending unit. The emitted light from the light source travels through the space, and collides with the surface of the object, such as a sheet of paper. Depending on the reflectivity of the object's surface, some amount of energy is reflected and reaches the receiving unit. Based on the amount of the received energy, the state of "presence" or "absence" of the object is determined.

Although this conventional method is, in general, acceptable, it is heavily dependent on the reflectivity of the object surface, and the stability of the light intensity of the light source. Furthermore, the received energy may be polluted by ambient light.

Another problem with conventional object detecting methods and systems concerns the effective energy on the returned light due to the reflection from various color papers. Where the paper on the paper tray is different colors, such as red, green or blue, the presence of color seems to confuse the signals, resulting in errors. Gain levels can be readjusted on existing sensors, but a setting that is too high may saturate the sensor for some strong signal, resulting in errors. There are more types and colors of paper and other print media available now than ever before. However, object detection sensor technology for these new materials does not appear to have improved along with the material technology.

The present invention also sends out light beams from a light source and receives returned energy reflected from the surface of the targeted object light; however, the light beam is utilized as a carrier rather than a signal. The light beam is modulated with a coded signal. In the present invention, the received energy (signal) is magnified by a high gain AC amplifier, and then sent to the decoder to check for the presence of the code.

The method/system of the present invention is not sensitive to the stability of ambient light intensity, and is relatively unaffected by reflectivity of the object surface. There is no need to include ambient light sensors or have other compensations for reflectivity built into the system of the present invention. This invention is also immune to ambient light conditions. Thus, accuracy and reliability are increased, and operator frustration and wasted time are decreased.

SUMMARY OF THE INVENTION

The present invention is a method for detecting the presence or absence of an object, comprising the steps of:
(a) modulating a light source of a reflective-type optical sensor with a coded digital/analog signal;
(b) emitting a code-modulated light beam from the light source and directing it toward the object;
(c) collecting the reflected code-modulated light beam with a receiver portion of the optical sensor;
(d) forwarding the signal from the reflected light beam through an AC amplifier and amplifying it; and
(e) feeding the amplified signal to a decoder and decoding it.

Also included herein is an input document detecting system for detecting the presence or absence of an object, comprising:
(a) a modulator, and a driver;
(b) a reflective-type optical sensor having an analog output, the optical sensor comprising a light source for emitting a light beam; an IR transmitter; and a receiver portion for collecting a reflected code-modulated light beam, the receiver portion comprising a built-in IR filter;
(c) a high gain AC amplifier for amplifying the signal from the reflected light beam; and
(d) a decoder for decoding the signal from the amplifier;
wherein the modulator modulates the light beam from the reflective-type optical sensor with a coded digital/analog signal; and
wherein the light source emits a code-modulated light beam, which is directed toward the object.

BRIEF DESCRIPTION OF THE DRAWINGS

A more complete understanding of the invention and its advantages will be apparent from the detailed description taken in conjunction with the accompanying drawings, wherein examples of the invention are shown, and wherein.

DETAILED DESCRIPTION OF THE INVENTION

Figure 1:
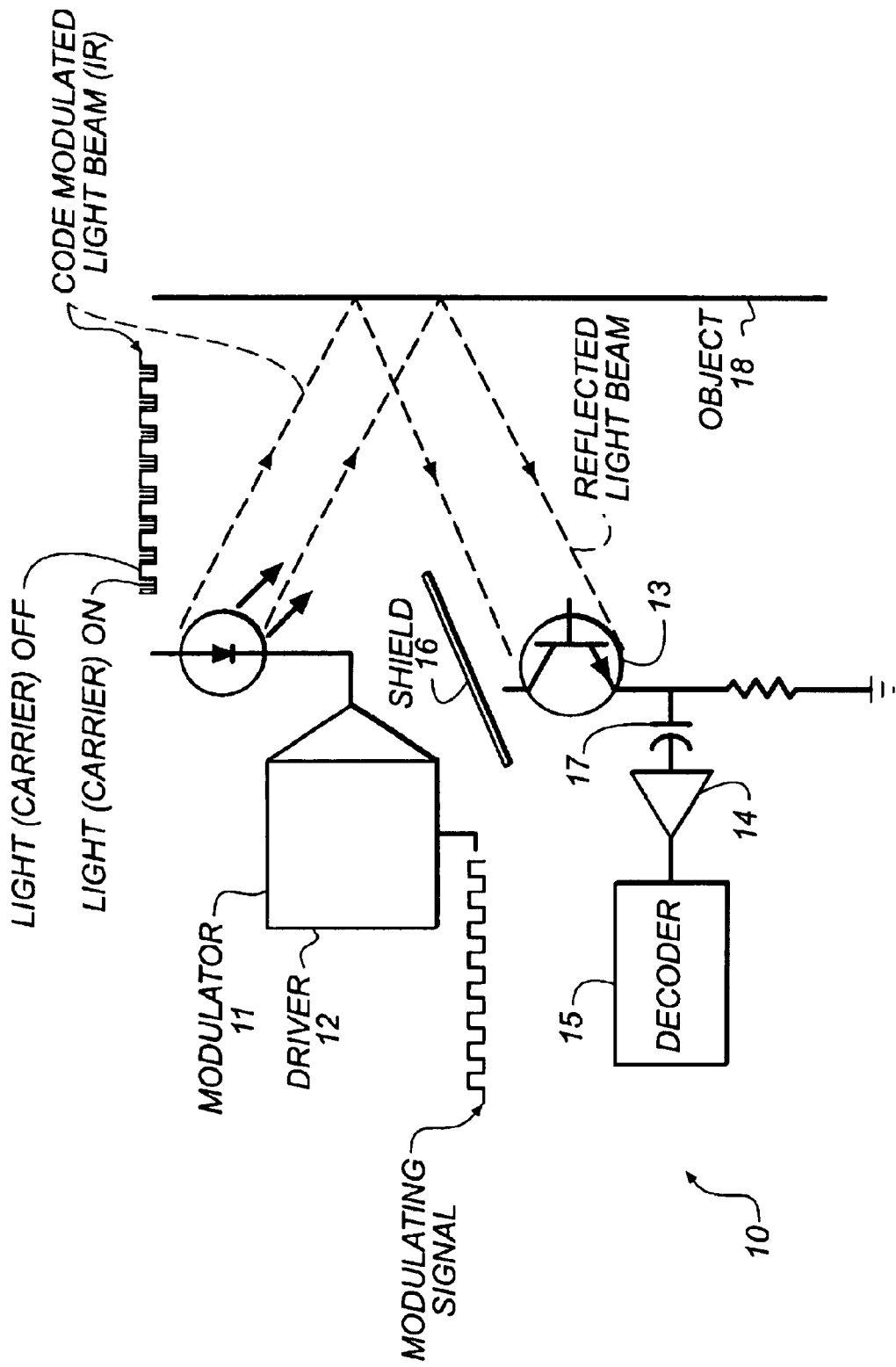
FIG. 1 is a diagrammatic view of an object detecting system according to the present invention.

In the following description, like reference characters designate like or corresponding parts throughout the several views. Also, in the following description, it is to be understood that such terms as "front," "above," "below," and the like are words of convenience and are not to be construed as limiting terms. Referring in more detail to the drawings, the invention will now be described.

Turning to FIG. 1, an input document detecting system which is generally referred to as 10, according to the present invention comprises: 1) a modulator 11, which comprises an encoder, and a driver 12; 2) a reflective-type optical sensor 13 having an analog output, the optical sensor comprising a light source for emitting a code-modulated light beam; an IR transmitter; and a receiver portion for collecting a reflected code-modulated light beam, the receiver portion comprising a built-in IR filter; 3) a high gain AC amplifier 14; 4) a decoder 15. It also preferably includes: 5) a shield 16 between the amplifier 14 and the emitting (11, 12) and receiving (13) portions of the object detecting system 10. Whether a shield is included herein depends upon the gain of the AC amplifier stage. Although the shield is not required, it is preferred for high gain designs. The shielding may include a metal cover on the AC amplifier, and also on the grounding on the wiring to and from the sensor.

The object detecting system 10 preferably further includes an AC coupling 17 between the optical sensor 13 and the amplifier 14. Regarding the optical sensor in #2, the transmitter is most preferably an IR light emitting diode (LED). The decoder (see #4) is preferably a phase lock loop (PLL) circuit.

Figure 2:
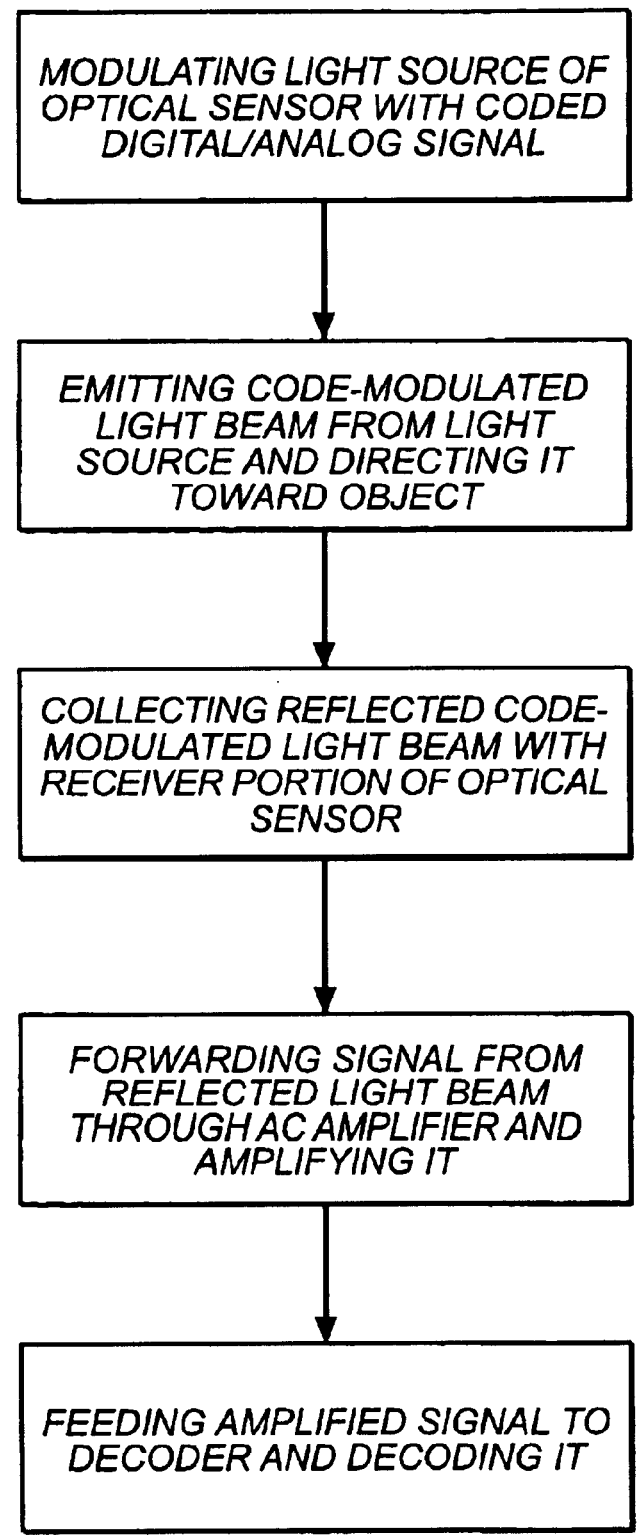
FIG. 2 is a flowchart of a method according to the present invention.

Referring to the flowchart of FIG. 2, a method for detecting the presence or absence of an object, ordinarily the surface of a paper, according to the present invention comprises the steps of:

(a) modulating a light source of a reflective-type optical sensor with a coded digital/analog signal;

(b) emitting a code-modulated light beam from the light source and directing it toward the object;

(c) collecting the reflected code-modulated light beam with a receiver portion of the optical sensor;

(d) forwarding the signal from the reflected light beam through an AC amplifier and amplifying it; and (e) feeding the amplified signal to a decoder and decoding it. The last step, (e), is done in order to detect the presence of the code.

The first step, modulating a light source of a reflective-type optical sensor with a coded digital/analog signal, is preferably done by: (a1) modulating a carrier infrared light beam with a message by an encoder, and (a2) feeding the modulated carrier to a driver. The modulated carrier will drive the sender (light source) to send out the coded light beam. The light beam is utilized as a carrier rather than a signal.

Continuing with FIG. 1, the reflective type optical sensor 13 used in this circuit has an analog output. The light source of the optical sensor 13 is modulated with a coded digital/analog signal. The emitted light beam, which carries the code, travels through the space, strikes the object 18, and bounces back to the receiver from the object 18. The receiver of the optical sensor 13 collects the reflected signal, and then sends it through the AC amplifier 14. Finally, the enlarged signal is fed to the decoder 15 to detect the presence of the code.

In the present invention, an infrared (IR) light beam is used as a carrier to send the modulating signal (message) out. The message is most preferably a band-limited 1.78 K Hz square-wave. Any band frequency can be chosen, but the intent is to avoid well-used, whole number frequency levels.

It has been found that uncommon frequencies, such as 1.78 K Hz, rather than commonly used frequencies, such as 1.5 K Hz, are optimal, since interference is less likely to be encountered. The encoder is preferably a selected band-limited square wave, which is paired with a decoder that is a phase lock loop (PLL) circuit operating in that frequency.

The present object detecting system is sending out a beam of light, which is modulated with a coded signal, from the light source and receiving returned energy reflected from the object document. The system is therefore unaffected by background radiation.

After the carrier is modulated with the message by the encoder, it is fed to the driver 12, which increases the power to drive the transmitter, and the IR light emitting diode (LED). The band-limits of the message signal to suppress the unwanted higher harmonic that might affect the results of the operation, and to minimize Electro-Magnetic Interference (EMI).

The reflective type optical sensor 13 with analog output contains the IR transmitter and the receiver with a built-in IR filter. The coded IR light beam is emitted from the LED of the optical sensor 13. The coded light beam travels through the space between the transmitter and the object, and bounces back as the light beam collides with the surface of the paper or other object 18. The returned energy is collected by the receiver of the optical sensor 13.

The high gain AC amplifier 14 is used to enlarge the received signal from the receiver 13. The present invention is directed to the presence of the message; clipping of the signal does not affect the result. The purpose of using the AC coupling 17 is to eliminate low frequency ambient signal/noise.

The amplified signal is then fed to the decoder 15 to check if the message exceeds. If the code is found embedded in the received signal, the system 10 then determines that an object is present. The phase lock loop (PLL) circuit is preferably used as the decoder 15 to detect the presence of the message.

Since there is a high gain amplifier 14 in the present system 10, the shield 16 is desirable for isolating the emitting and receiving path to prevent the signal from being "short circuited."

Once the determination has been made using the present object detection system 10, the printer scanner or other equipment will receive the signal. If the object is determined to be present, the equipment will feed the sheet into the paper path. If the object is determined to be absent, the paper tray will be lowered and a visual or auditory signal will be emitted to notify the operator to load up the next batch of scanning material or proceed with other appropriate action. Otherwise, the paper tray will be continuously raised to maintain the top level of the paper supply.

Thus, when a code is found embedded in the decoded signal of step (e) the method further includes the step (f1) of: emitting an "object present" signal to an interconnected automatic document feeder of a scanner; and then step (g1): feeding a next document from a document supply tray into a paper path of the scanner. When no code is found embedded in the decoded signal of step (e), the method further includes the alternate step (f2) of: emitting an "object absent" signal to an interconnected automatic document feeder of a scanner; and then step (g2): lowering a document supply tray of the scanner; and step (g3): emitting a visual or auditory signal for signaling that the document tray is empty.

Further in regard to the method of the present invention, the coded signal in step (a1) is preferably a band-limited square wave, while decoding in step (e) is preferably by a phase lock loop (PLL) circuit operating in the same frequency. A preferred method further includes the step (c2) of: eliminating low frequency ambient noise by using an AC coupling prior to steps (d) and (e). A preferred method also includes the step of: shielding steps (a) and (b) from steps (c), (d), and (e).

Projected pulsed radiation is preferably not employed herein, nor is an extraneous component, such as a liquid, applied to the surface of the document in the supply tray for measuring light reflected from the surface of the component/ liquid. There is no need to use ambient light sensors with the present invention, since reflectivity is not a problem.

The invention has been described in detail with particular reference to certain preferred embodiments thereof, but it will be understood that variations and modifications can be effected within the spirit and scope of the invention as described hereinabove and as defined in the appended claims by a person of ordinary skill in the art, without departing from the scope of the invention. While preferred embodiments of the invention have been described using specific terms, this description is for illustrative purposes only. It is intended that the doctrine of equivalents be relied upon to determine the fair scope of these claims in connection with any other person's product which fall outside the literal wording of these claims, but which in reality do not materially depart from this invention.

Parts List

10 Object detecting system
11 Modulator
12 Driver
13 Optical sensor
14 AC amplifier
15 Decoder
16 Shield
17 AC coupling
18 Object

What is claimed is:

1. An input document detecting method for detecting the presence of an object, comprising the steps of:
   (a) modulating a light source of a reflective-type optical sensor with a coded digital/analog signal;
   (b) emitting a code-modulated light beam from the light source and directing it toward the object;
   (c) collecting the reflected code-modulated light beam with a receiver portion of the optical sensor;
   (d) forwarding the signal from the reflected light beam through an AC amplifier and amplifying it; and
   (e) feeding the amplified signal to a decoder and decoding it.

2. A method according to claim 1 wherein step (a): modulating a light source of a reflective-type optical sensor with a coded digital/analog signal, further comprises the steps of: (a1) modulating a carrier with a message by an encoder, and (a2) feeding the modulated carrier to a driver.

3. A method according to claim 2 wherein, in step (a1), the coded signal is a band-limited square wave.

4. A method according to claim 3 wherein, in step (e), decoding is by a phase lock loop (PLL) circuit operating in the same frequency.

5. A method according to claim 1 further comprising the step (c2) of: eliminating low frequency ambient noise by using an AC coupling prior to steps (d) and (e).

6. A method according to claim 1 further comprising the step of: shielding steps (a) and (b) from steps (c), (d), and (e).

7. A method according to claim 1 further comprising the step (f1) when a code is found embedded in the decoded signal of step (e) of: emitting an "object present" signal to an interconnected automatic document feeder of a scanner.

8. A method according to claim 7 further comprising the step (g1) of: feeding a next document from a document supply tray into a paper path of the scanner.

9. A method according to claim 1 further comprising the step (f2) when no code is found embedded in the decoded signal of step (e) of: emitting an "object absent" signal to an interconnected automatic document feeder of a scanner.

10. A method according to claim 9 further comprising the step (g2) of: lowering a document supply tray of the scanner; and step (g3): emitting a visual or auditory signal for signaling that the document tray is empty.

11. An input document detecting system for detecting the presence or absence of an object, comprising:
   a) a modulator and a driver;
   b) a reflective-type optical sensor having an analog output, the optical sensor comprising a light source for emitting a light beam; an IR transmitter; and a receiver portion for collecting a reflected code-modulated light beam, the receiver portion comprising a built-in IR filter;
   c) a high gain AC amplifier for amplifying the signal from the reflected light beam; and
   d) a decoder for decoding the signal from the amplifier;
   wherein the modulator modulates the light beam from the reflective-type optical sensor with a coded digital/ analog signal; and
   wherein the light source emits a code-modulated light beam, which is directed toward the object.

12. A system according to claim 11 further comprising e) a shield between the amplifier and the modulator/driver of the input document detecting system.

13. A system according to claim 11 further comprising an AC coupling between the optical sensor and the amplifier.

14. A system according to claim 13 wherein the modulator comprises an encoder for producing a message for modulating the light beam.

15. A system according to claim 11 wherein the decoder is a phase lock loop circuit.

16. A system according to claim 14 wherein the encoder is a selected band-limited square wave, which is paired with a decoder that is a phase lock loop (PLL) circuit operating in that frequency.

17. A system according to claim 11 wherein the transmitter is an IR (infrared) light emitting diode.

* * * * *